(12) United States Patent
Fluck

(10) Patent No.: US 6,220,424 B1
(45) Date of Patent: Apr. 24, 2001

(54) METHOD AND APPARATUS FOR TRANSFERRING ITEMS FROM A CONVEYOR

(75) Inventor: René Fluck, Schleitheim (CH)

(73) Assignee: SIG Pack Systems AG, Beringen (CH)

( * ) Notice: Subject to any disclaimer, the term of this patent is extended or adjusted under 35 U.S.C. 154(b) by 0 days.

(21) Appl. No.: 09/129,535

(22) Filed: Aug. 5, 1998

(30) Foreign Application Priority Data

Aug. 5, 1997 (CH) ................................... 1861/97

(51) Int. Cl.[7] .................................................. B65G 15/58
(52) U.S. Cl. ................................ 198/468.6; 198/468.8; 198/430
(58) Field of Search ..................... 198/468.01, 468.3, 198/468.6, 488.8, 430, 427

(56) References Cited

U.S. PATENT DOCUMENTS

| | | | |
|---|---|---|---|
| 3,186,564 | * 6/1965 | Hyer | 198/468.8 |
| 4,498,573 | * 2/1985 | Anderson et al. | 198/374 |
| 4,573,862 | * 3/1986 | Anderson | 198/468.2 |
| 5,186,599 | * 2/1993 | Fluck . | |
| 5,190,138 | * 3/1993 | Strasser et al. | 198/468.8 |
| 5,680,936 | * 10/1997 | Beers | 198/468.6 |

FOREIGN PATENT DOCUMENTS

| | | | |
|---|---|---|---|
| 591385 | * 1/1934 | (DE) | 198/430 |
| 0 526 403 | 8/1995 | (EP) . | |
| 2446785 | * 9/1980 | (FR) | 198/430 |
| 0053919 | * 3/1989 | (JP) | 198/468.6 |
| 0110423 | * 4/1989 | (JP) | 198/468.6 |

* cited by examiner

*Primary Examiner*—Robert P. Olszewski
*Assistant Examiner*—Steven B. McAllister
(74) *Attorney, Agent, or Firm*—Venable; Gabor J. Keleman

(57) ABSTRACT

A transporting apparatus includes a conveyor for advancing items and a transfer apparatus for lifting the items off the conveyor and for depositing the items at a location externally of the conveyor. The transfer apparatus has hoisting devices spaced from one another in the conveying direction. Each hoisting device has first and second lifters spaced from one another in a direction transverse to the conveying direction and being situated bilaterally of the conveyor. A first drive moves the first and second lifters into raised and lowered positions; and a second drive moves the first and second lifters toward and away from one another to cause them to assume a normal position and a spread-out position. First and second tray parts of a tray forming part of each hoisting device are mounted on the first and second lifter, respectively. In the raised and lowered positions the trays are clear of a travel path of the items on the conveyor. Each tray, when being raised from the lowered position into the raised position, is adapted to lift an article off the conveyor. The first and second tray parts of each tray are moved away from one another by the first and second lifters upon displacement thereof into the spread-out position as the trays are moved toward the lowered position. Further, an arrangement is provided for removing the items from the trays in a raised position thereof.

14 Claims, 2 Drawing Sheets

METHOD AND APPARATUS FOR TRANSFERRING ITEMS FROM A CONVEYOR

CROSS REFERENCE TO RELATED APPLICATION

This application claims the priority of Swiss Application No. 1861/97 filed Aug. 5, 1997, which is incorporated herein by reference.

BACKGROUND OF THE INVENTION

This invention relates to a method and an apparatus for transferring items, particularly flat confectionary products, from a conveyor advanced in a single column thereon. In particular, the apparatus is intended for engaging and transferring items arranged consecutively in the conveying direction, for example, for jointly introducing them into a packaging container.

Published European Application 526 403 discloses an apparatus having suction grippers arranged serially in the conveying direction to grasp, individually or in groups, confectionary items delivered on a conveyor belt in order to deposit them into packing shells.

SUMMARY OF THE INVENTION

It is an object of the invention to provide an improved transporting (conveying and transferring) apparatus and method of the above-outlined type which is capable of an increased output as compared to conventional arrangements.

This object and others to become apparent as the specification progresses, are accomplished by the invention, according to which, briefly stated, the transporting apparatus includes a conveyor for advancing items and a transfer apparatus for lifting the items off the conveyor and for depositing the items at a location externally of said conveyor. The transfer apparatus has hoisting devices spaced from one another in the conveying direction. Each hoisting device has first and second lifters spaced from one another in a direction transverse to the conveying direction and being situated bilaterally of the conveyor. A first drive moves the first and second lifters into raised and lowered positions; and a second drive moves the first and second lifters toward and away from one another to cause them to assume a normal position and a spread-out position. First and second tray parts of a tray forming part of each hoisting device are mounted on the first and second lifter, respectively. In the raised and lowered positions the trays are clear of a travel path of the items on the conveyor. Each tray, when being raised from the lowered position into the raised position, is adapted to lift an article off the conveyor. The first and second tray parts of each tray are moved away from one another by the first and second lifters upon displacement thereof into the spread-out position as the trays are moved toward the lowered position. Further, an arrangement is provided for removing the items from the trays in a raised position thereof.

DESCRIPTION OF THE PREFERRED EMBODIMENTS

Figure 1:
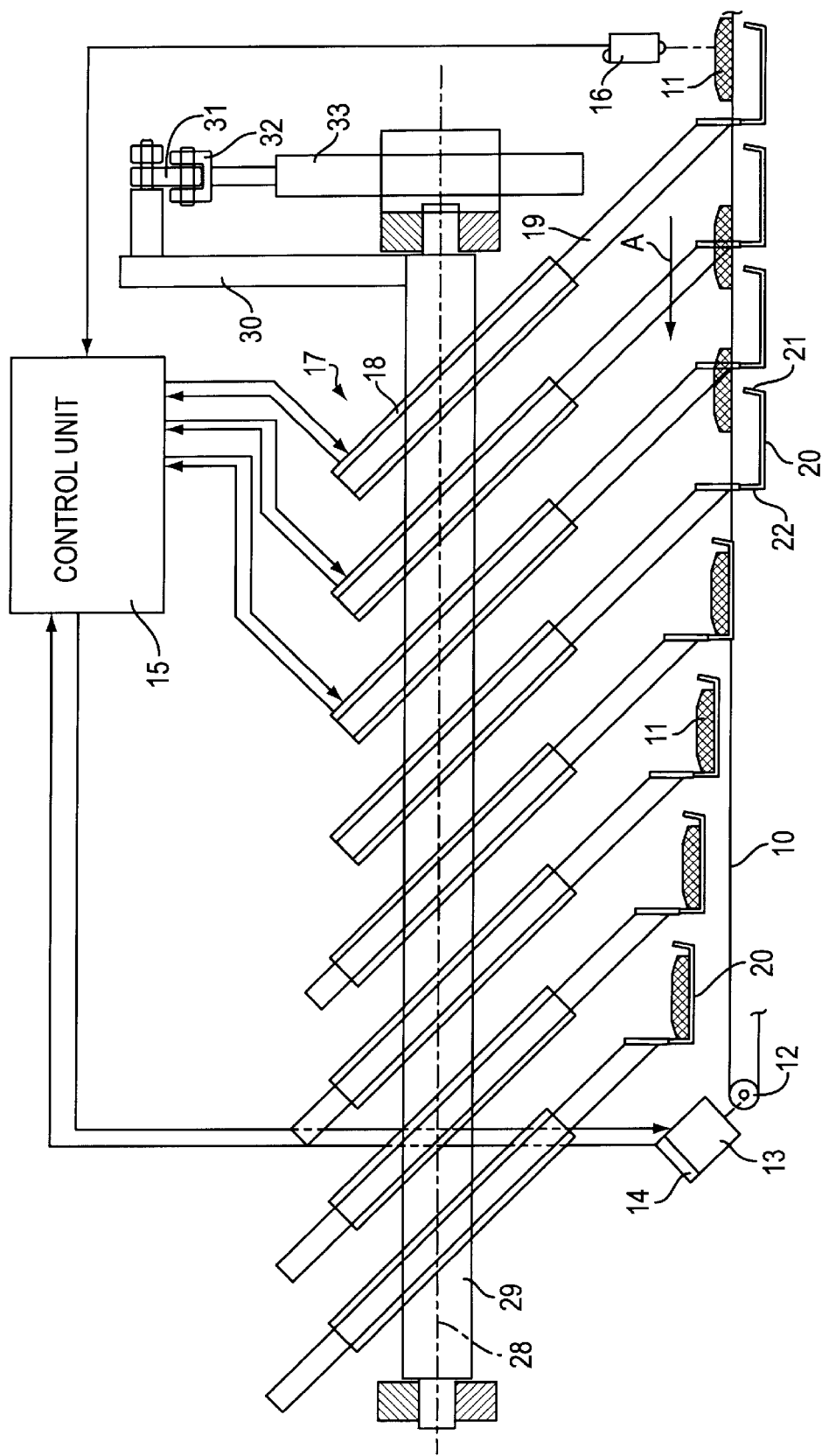
FIG. 1 is a schematic side elevational view a preferred embodiment of the invention.

Turning to FIG. 1, on a conveying device, constituted by a narrow conveyor belt 10, items 11 are advanced in a single column in a conveying direction A such that the items 11 project beyond both sides of the conveyor belt 10. An end roll 12 supporting the conveyor belt 10 is driven by a motor 13 which is associated with an angular position sensor 14. The motor 13 and the sensor 14 are connected to a control unit 15. At the upstream end of the conveyor belt 10 an item sensor 16, such as an optical barrier is arranged which is also connected to the control unit 15. Along the conveyor belt 10 uniformly spaced hoisting devices 17 are arranged in pairs on both sides of the conveyor belt 10. The hoisting devices 17 include linear motors 18 having stroke feedback means. The motors 18 are individually controlled by the control unit 15. The axes of the motors 18 are inclined between 30° and 60°, preferably at approximately 45°, to the plane of the upper reach of the conveyor belt 10. The drive rods or lifters 19 of the motors 18 each carry at their lower end an item support constituted by a bent tray 20 having a frontal and a rearward abutment 21, 22, respectively. The trays 20 may be lifted from a lower, pass-through position illustrated for the four right-hand trays in FIG. 1 into an upper pass-through position illustrated for the leftmost tray 20 in FIG. 1. In both pass-through positions the items 11 may be conveyed in an unimpeded manner by the conveyor belt 10 above or underneath the trays 20.

Figure 2:
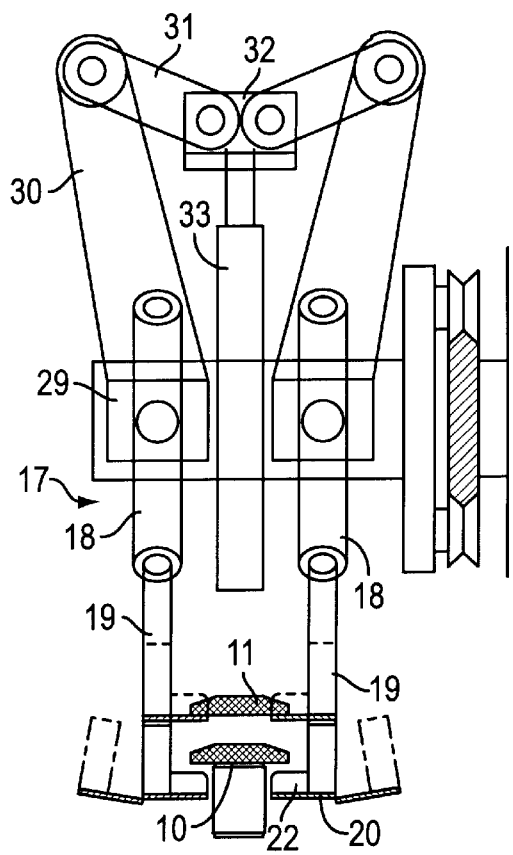
FIGS. 2, 3 and 4 are schematic sectional front elevational views of the apparatus illustrated in FIG. 1, showing different operational positions and modes of operation.

Also referring to FIG. 2, each tray 20 is a two-part structure, and the motors 18 are arranged in pairs, wherein one pair serves one tray 20 such that the actuating rods 19 of the two motors 18 of one pair are attached to the one and the other, relatively movable parts of the respective tray 20. The motors 18 are mounted in two parallel carriers 29 pivotal about horizontal axes 28. To each carrier 29 an upwardly projecting lever 30 is secured whose free end is articulated by means of a link rod 31 to a vertically guided block 32 which is driven by a further linear motor 33, also connected to the control unit 15. By means of the linear motor 33 the carriers 29 may be pivoted so that the two parts of each tray 20, as the trays 20 are lowered, are pivoted away from one another to ensure that the tray 20 does not interfere with the travel path of the items 11. As soon as the lower pass-through position is reached, the two parts of each tray 20 are again pivoted into their basic position shown in solid lines in FIG. 2 in which their inner edge is just slightly beyond the outer edge of the conveyor belt 10. As a result, upon upward movement of the trays 20, they engage the overhanging item 11 and lift the same off the conveyor 10.

In operation, the passage of each item 11 is detected by the sensor 16, and the respective downstream-most motor 18, whose rod 19 has not yet been retracted (lifted), is actuated as soon as the item 11 arrives over the respective tray 20. Such a position of the item 11 is determined by the summation of the measured rotary angle of the motor 13. Since the axes of the motors 18 are inclined, the trays 20 have, as they are raised by the rods 19, a motion component in the conveying direction A. In this manner, a gentle engagement of the items 11 by the trays 20 and a high output rate may be achieved.

Figure 3:
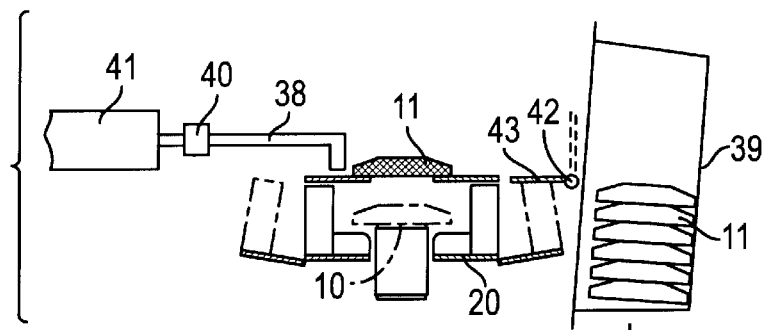

Referring to FIG. 3, after all the trays 20 have been lifted, plungers 38 push the items 11 into the collecting bin 39. The plungers 38 are secured to a common, parallel-guided carrier 40 which is actuated by a further motor 41. To ensure that upon pushing the items 11 off the trays 20, they do not fall into the clearance between two spread-apart parts of each tray 20, it is expedient to move the tray parts toward one another in their upper pass-through position by means of the motor 33. It may be further expedient to provide a lateral slide plate 43 pivotal in a vertical plane about a horizontal axis 42. For the lateral item-shifting operation by the plunger 38 the slide plate is pivoted downwardly into its solid-line position to serve as a sliding support for the items 11 as they are pushed from the trays 20 into the container 39.

Figure 4:
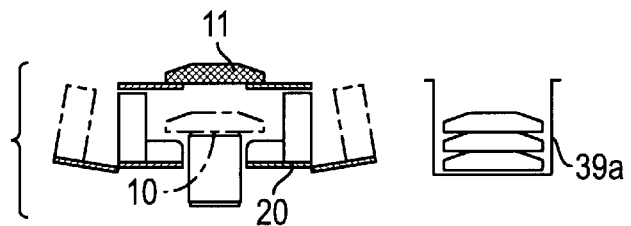

According to the variant shown in FIG. 3, the flat items 11 are pushed into the containers 39 such that their main plane is perpendicular to the container bottom (oriented in a substantially upstanding position) and, at the same time, the container 39 is intermittently lowered between the insertion steps. According to the variant shown in FIG. 4, the flat items 11 are deposited into the container 39a such that their main plane is parallel to the container bottom (oriented in a substantially horizontal position) and form a stack therein.

The described apparatus and the transporting method make possible a gentle treatment of the items 11 at a high output. At the downstream end of the conveyor belt 10 a further, identical apparatus or a collecting container or an accumulator may be arranged, for example, to advance the items 11, delivered by the conveyor belt 10, to the adjoining further processing apparatus or to gather the items 11 when the packing machine is idle. In conventional machines, such a pass-through of items is difficult to achieve. The apparatus according to the invention is also adapted to handle items which cannot be manipulated by suction, for example, because of their sticky upper surface.

The apparatus is also adapted to handle other flat, disk-shaped items, for example, frustoconical soft cakes. In such a case, the item-supports (trays) are of arcuate rather than flat configuration. It is also feasible to mount the entire unit, formed of elements 17–22 and 28–33 on a carrier which is pivotal about an axis parallel to the axes 28. In such a case, the items 11 may be lowered by means of the hoisting elements 17 directly into the packing container. It is to be noted, however, that such an arrangement reduces the output.

It will be understood that the above description of the present invention is susceptible to various modifications, changes and adaptations, and the same are intended to be comprehended within the meaning and range of equivalents of the appended claims.

What is claimed is:

1. A transporting apparatus comprising
   (a) a conveyor for advancing a column of items in a conveying direction; and
   (b) a transfer apparatus for lifting the items off the conveyor and for depositing the items at a location externally of said conveyor; said transfer apparatus including:
      (1) a plurality of hoisting devices spaced from one another in said conveying direction along said conveyor; each hoisting device having
         (i) first and second lifters spaced from one another in a direction transverse to said conveying direction and being situated bi-laterally of said conveyor; said first and second lifters having a direction of motion forming an angle of 30° to 60° with said conveying direction;
         (ii) first drive means for moving said first and second lifters into raised and lowered positions;
         (iii) second drive means for moving said first and second lifters toward and away from one another to cause said first and second lifters to assume a normal position and a spread-out position;
      (2) a plurality of trays composed of first and second tray parts; with each said hoisting device there being connected a respective one of said trays such that said first tray part is mounted on and carried by said first lifter and said second tray part is mounted on and carried by said second lifter; in said raised and lowered positions said trays being clear of a travel path of said items on said conveyor; each said tray, when being raised from said lower position into said raised position by a respective said hoisting device, being adapted to lift an article off said conveyor; said first and second tray parts of each said tray being moved away from one another by said first and second lifters upon displacement thereof into said spread-out position as said trays are being moved toward said lowered position; and
      (3) means for removing the items from said trays in a raised position thereof.

2. The apparatus as defined in claim 1, wherein said trays have an upstream side and a downstream side as viewed in said conveying direction; further comprising an article-stopping element disposed at said downstream side.

3. The apparatus as defined in claim 2, further comprising an additional article-stopping element disposed at said upstream side.

4. The apparatus as defined in claim 1, wherein said first drive means include an individual drive contained in each said hoisting device; said individual drive being coupled with and being common to said first and second lifters of respective said hoisting devices.

5. The apparatus as defined in claim 4, wherein said individual drive is a linear motor including a stroke feedback device.

6. The apparatus as defined in claim 1, further comprising a sensor arranged at said conveyor for detecting passage of items thereon; and a control device connected to said conveyor, said sensor, said first drive means and said second drive means for controlling said first and second drive means in dependence from signals derived from said sensor.

7. A transporting apparatus comprising
   (a) a conveyor for advancing a column of items in a conveying direction; and
   (b) a transfer apparatus for lifting the items off the conveyor and for depositing the items at a location externally of said conveyor; said transfer apparatus including:
      (1) a plurality of hoisting devices spaced from one another in said conveying direction along said conveyor; each hoisting device having
         (i) first and second lifters spaced from one another in a direction transverse to said conveying direction and being situated bi-laterally of said conveyor;
         (ii) first drive means for moving said first and second lifters into raised and lowered positions;
         (iii) second drive means for moving said first and second lifters toward and away from one another to cause said first and second lifters to assume a normal position and a spread-out position;
      (2) a plurality of trays composed of first and second tray parts; with each said hoisting device there being connected a respective one of said trays such that said first tray part is mounted on and carried by said first lifter and said second tray part is mounted on and carried by said second lifter; in said raised and lowered positions said trays being clear of a travel path of said items on said conveyor; each said tray, when being raised from said lower position into said raised position by a respective said hoisting device, being adapted to lift an article off said conveyor; said first and second tray parts of each said tray being moved away from one another by said first and second lifters upon displacement thereof into said spread-out position as said trays are being moved toward said lowered position; and (3) removing means for removing the items from said trays in a raised position thereof; said removing means including a pusher situated at a height level of said raised position of said trays; said pusher being arranged for displacements transverse to said conveying direction.

8. The apparatus as defined in claim 7, wherein said trays have an upstream side and a downstream side as viewed in said conveying direction; further comprising an article-stopping element disposed at said downstream side.

9. The apparatus as defined in claim 8, further comprising an additional article-stopping element disposed at said upstream side.

10. The apparatus as defined in claim 7, wherein said first drive means include an individual drive contained in each said hoisting device; said individual drive being coupled with and being common to said first and second lifters of respective said hoisting devices.

11. The apparatus as defined in claim 10, wherein said individual drive is a linear motor including a stroke feedback device.

12. The apparatus as defined in claim 7, further comprising a sensor arranged at said conveyor for detecting passage of items thereon; and a control device connected to said conveyor, said sensor, said first drive means and said second drive means for controlling said first and second drive means in dependence from signals derived from said sensor.

13. The apparatus as defined in claim 7, wherein said angle is about 45°.

14. A method of transferring items advanced in a column on a conveyor in a conveying direction, comprising the following steps:

(a) positioning a plurality of two-part trays in a lower position below the conveyor clear of a travel path of the items;

(b) raising the trays above the conveyor into a raised position above the conveyor clear of the travel path of the items; said raising step being initiated independently for each said tray in dependence of a signal from a sensor monitoring passage of the items on the conveyor;

(c) while performing step (b), lifting an item off the conveyor by the respective tray;

(d) removing the items from the trays after step (c);

(e) lowering the trays below the conveyor into said lower position; and (f) while performing step (e), moving the first and second tray parts of the trays away from one another in a direction transverse to said conveying direction to avoid collision with an item on the conveyor.

\* \* \* \* \*